No. 828,742. PATENTED AUG. 14, 1906.
B. H. JONES.
METALLIC BEDSTEAD.
APPLICATION FILED SEPT. 29, 1905.
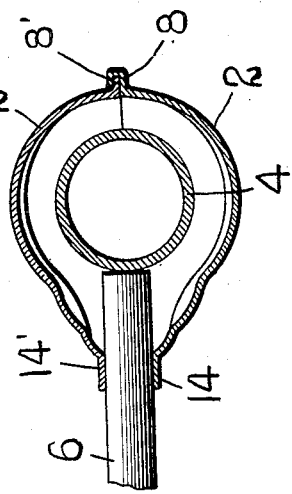
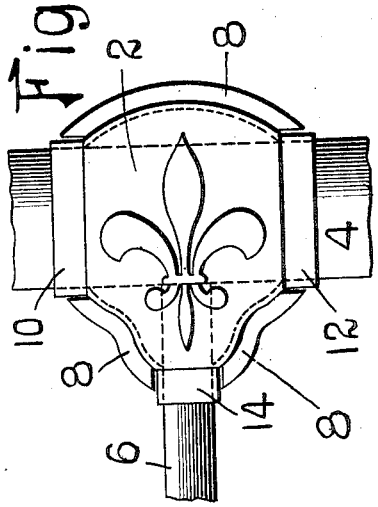
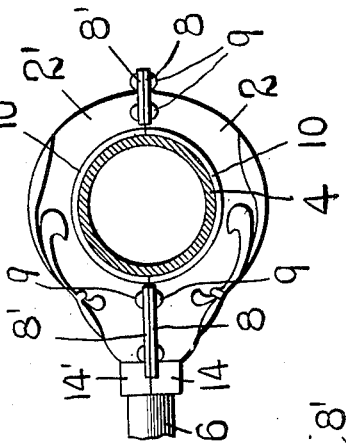
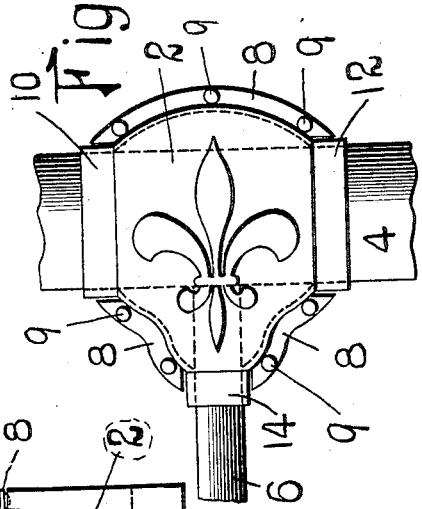
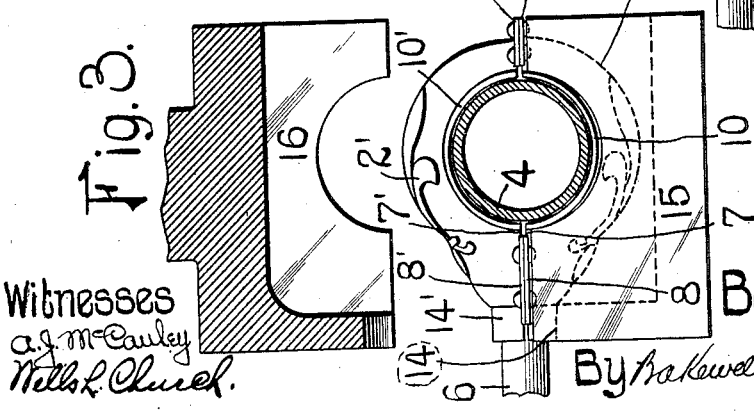
Witnesses
Inventor
Benj. H. Jones
By Bakewell Cornwall Attys.

UNITED STATES PATENT OFFICE.

BENJAMIN H. JONES, OF ST. LOUIS, MISSOURI.

METALLIC BEDSTEAD.

No. 828,742.  Specification of Letters Patent.  Patented Aug. 14, 1906.

Application filed September 29, 1905. Serial No. 280,678.

To all whom it may concern:

Be it known that I, BENJAMIN H. JONES, a citizen of the United States, residing at St. Louis, Missouri, have invented a certain new and useful Improvement in Metallic Bedsteads, of which the following is a full, clear, and exact description, such as will enable others skilled in the art to which it appertains to make and use the same, reference being had to the accompanying drawings, forming part of this specification, in which—

Figure 1 is a top plan view of a pressed-steel coupling constructed in accordance with my invention, showing the coupling in operative position for connecting together the corner-post and the cross-rod of a metallic bedstead. Fig. 2 is a side elevation of the coupling and parts of the bedstead shown in Fig. 3. Fig. 3 is an elevation, partly in section, of a drop-hammer such as may be used for bending portions of the coupling into engagement with the parts which the coupling is to join together. Fig. 4 is a transverse sectional view of a modified form of coupling, and Fig. 5 is a side elevation of the form shown in Fig. 4.

This invention relates to improvements in metallic bedsteads; and one object of the invention is to provide a sheet-metal coupling for rigidly connecting together two or more parts of a bedstead—such, for example, as a corner-post and a cross-rod.

Another object of my invention is to provide an improved coupling which will be strong and present an ornamental appearance and which can be manufactured cheaply.

Prior to my invention the couplings which have been in general use for connecting the corner-posts to the cross-rods of a bed or for connecting the fillings to the cross-rods have been in one piece and formed of cast-iron or of malleable iron and usually were fastened to the parts which they joined together by means of rivets. Couplings of this character have not proved satisfactory on account of the expense in manufacture and also the liability of breakage of the couplings or of the rivets. To overcome these objectionable features, I have devised a coupling comprising two members formed of sheet metal, which are joined together and then have a portion thereon bent or pressed into intimate engagement with the parts of the bedstead which they are to join.

In the construction illustrated in the drawings, which represent the preferred form of my invention, 2 and 2' designate the two halves or members of a T-coupling to be used for rigidly connecting together the corner-posts 4 of a bedstead and the cross-rods 6, the cross-rods being the horizontally-extending rods at the foot and head of the bed to which the vertical filling-rods are connected. The members 2 and 2' are preferably formed of pressed sheet-steel, which insures a very strong coupling having a smooth and finished surface and also enables a design to be embossed on the coupling at the time that the members are being shaped. Projecting from the coöperating members 2 and 2' are flanges 8 and 8', which in the form of my invention shown in Figs. 1 to 3 are adapted to be fastened together by rivets. At the upper portions of said coöperating members are semicircular-shaped pieces 10 and 10', which form a collar when the coöperating members are fastened together, at the bottom pieces 12 and 12' of the same shape, and at the side portions pieces 14 and 14' of the same shape, which pieces are adapted to be bent or pressed into engagement with the corner-post and cross-rod, thereby rigidly connecting said corner-post and cross-rod together.

In Fig. 3 I have shown one form of mechanism which may be conveniently used for bending the collars on the coupling so that they will impinge tightly upon the corner-post and cross-rod, said mechanism consisting of a drop-hammer comprising a lower die 15 and an upper die 16. As shown in Fig. 3 of the drawings, the semicircular-shaped pieces on the members 2 and 2' are not joined to the flanges, but are separated therefrom by notches 7 and 7', so that when said pieces are bent the diameter of the collars which said pieces form will be reduced, but the flanges will not be displayed, the ends of said pieces abutting closely, as shown in Fig. 1. Preferably the upper half and the lower half of the coupling are of the same shape and configuration, so that it is not necessary to form right and left members, and any two members may be fastened together to form a coupling. This also is a very desirable feature, as only one die is required for forming both members of the coupling, and the cost of manufacture is accordingly reduced. In connecting the corner and cross-rod of a bed together by my improved coupling the members 2 and 2' of the coupling are assembled around the corner-post and the cross-rod and the flanges 8 and 8' are fastened together by rivets 9. The coupling, with the corner-post and cross-rod therein, is then placed on the lower die of the drop-hammer, the upper and lower dies being then moved together to bend the semicircular-shaped pieces on said members and cause them to tightly clamp the corner-post and cross-rod, whereby said post and rod are securely joined together. The coupling and the parts which it joins are then enameled, the enamel entering the crevices or cracks between the flanges of each member and also the crevices between the collars and said parts and acting as an adhesive, which adds to the security of the joint and merges the abutting members of the coupling and the parts which it joins. My improved coupling is also used for connecting the vertical filling-rods of a bed to the horizontal cross-rods.

In Figs. 4 and 5 I have shown a modified form of my invention, in which the members of the coupling are connected together by a locked joint. While I have herein shown my improved coupling as connecting round rods and posts together, it should be understood that it could be used equally well for connecting rods of other shape in cross-section.

Having thus described my invention, what I claim as new, and desire to secure by Letters Patent, is—

1. As an article of manufacture, a coupling for rigidly connecting together the rod and post of a metallic bedstead comprising a plurality of pressed sheet-metal members fastened together, each member having a plurality of parts that are adapted to be pressed into intimate engagement with the rod and post which the coupling joins together; substantially as described.

2. As an article of manufacture, a T-coupling for rigidly connecting together the rod and post of a metallic bedstead comprising a plurality of pressed sheet-metal members of the same shape and size having laterally-extending flanges which are riveted together, each member being provided with a plurality of semicircular-shaped pieces that are adapted to be pressed into engagement with the rod and post which the coupling joins together; substantially as described.

3. As an article of manufacture, a T-coupling for rigidly connecting two members together comprising pressed sheet-metal members having flanges which are connected together, each member being provided with semicircular-shaped pieces which are separated from said flanges by notches, said pieces being adapted to be pressed into intimate engagement with the parts which the coupling joins together; substantially as described.

4. A coupling for rigidly fastening together a plurality of parts of a metallic bedstead, comprising two coöperating members of the same shape and configuration formed of pressed sheet metal and fastened together longitudinally of two of the parts which it connects, and means on said members adapted to be bent into engagement with the parts which the coupling connects together; substantially as described.

In testimony whereof I hereunto affix my signature, in the presence of two witnesses, this 25th day of September, 1905.

BENJAMIN H. JONES.

Witnesses:
WELLS L. CHURCH,
GEORGE BAKEWELL.